Oct. 21, 1924.
J. A. OLDSON
1,512,479
BALANCED CRANK SHAFT
Filed Jan. 8, 1923
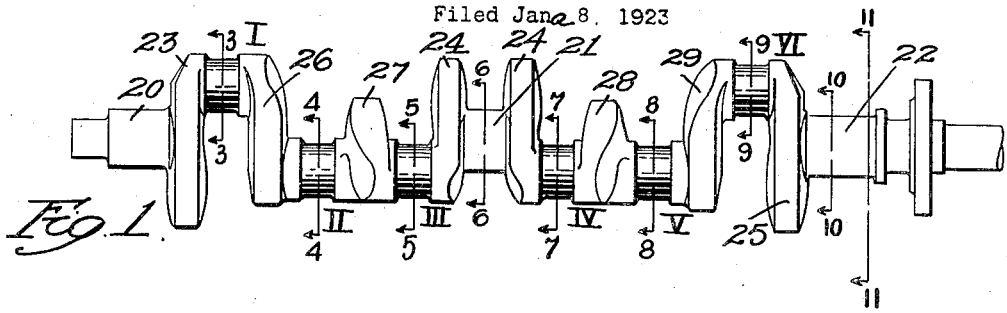
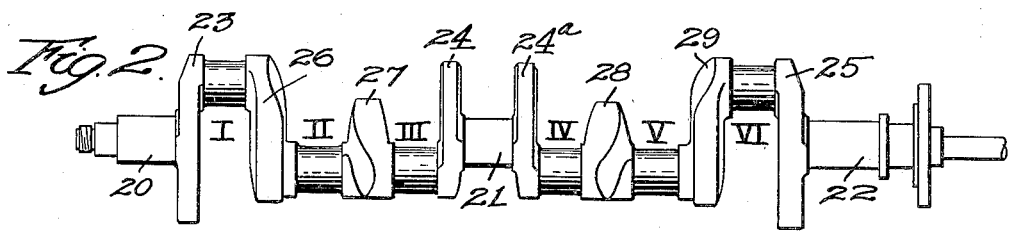
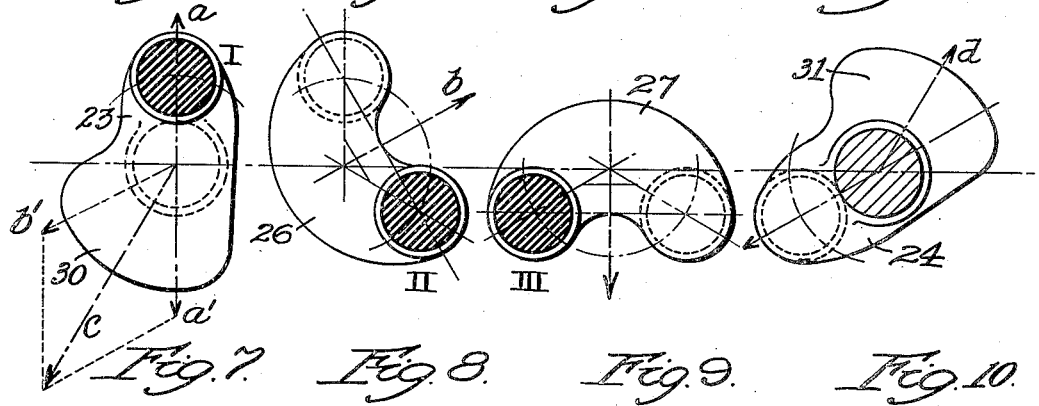
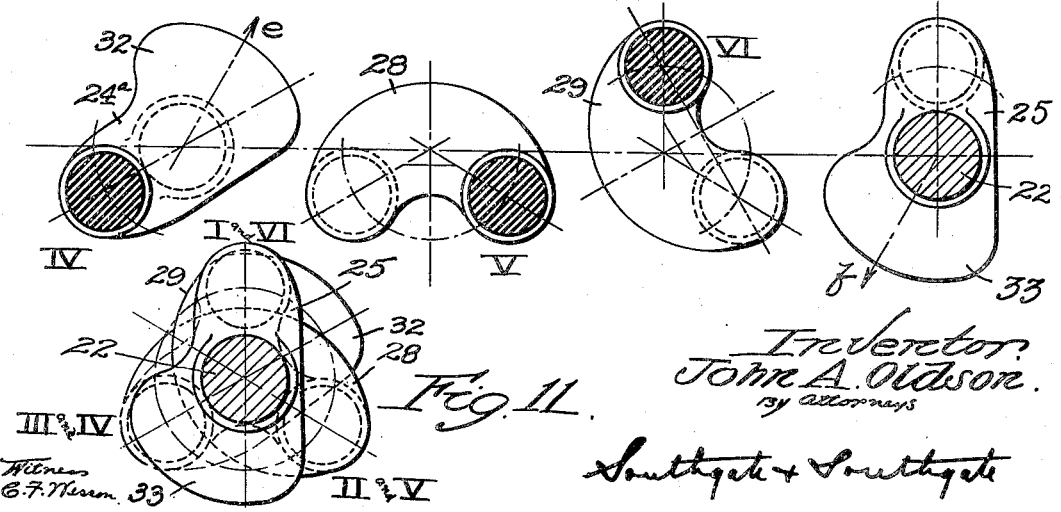
Inventor
John A. Oldson.
by attorneys
Southgate & Southgate
Witness
C. F. Mason Patented Oct. 21, 1924.

1,512,479

UNITED STATES PATENT OFFICE.

JOHN A. OLDSON, OF WORCESTER, MASSACHUSETTS, ASSIGNOR TO WYMAN-GORDON COMPANY, OF WORCESTER, MASSACHUSETTS, A CORPORATION OF MASSACHUSETTS.

BALANCED CRANK SHAFT.

Application filed January 8, 1923. Serial No. 611,237. REISSUED

*To all whom it may concern:*

Be it known that I, JOHN A. OLDSON, a citizen of the United States, residing at Worcester, in the county of Worcester and State of Massachusetts, have invented a new and useful Balanced Crank Shaft, of which the following is a specification.

This invention relates to a new and exceedingly simple construction for balancing a multiple crank shaft, by means of which the running qualities of the shafts are much improved. In such shafts, unbalanced centrifugal forces are developed by the different cheeks, which produce an increasing tendency to distortion and whipping of the shaft as the speed increases.

Many methods of counter-balancing such shafts have been developed, commonly by separately counter-balancing each separate cheek by bolting or otherwise securing a counter-weight thereto. This procedure involves much labor and greatly increases the weight and cost of the shaft.

It is the object of my invention to provide a much simpler and cheaper construction by means of which all necessary counter-balancing effect may be obtained and a highly efficient and satisfactory shaft may be produced.

With this general object in view, my invention consists primarily in providing a single counter-weight for each pair of adjacent cheeks in a crank shaft, so proportioned and disposed that it will effectively counter-balance the resultant of the unbalanced centrifugal forces of two adjacent crank-shaft cheeks.

In the drawings, my invention is shown embodied in a six-throw three-bearing shaft, having the usual straight single cheeks adjacent the shaft bearings and having intermediate curved cheeks connecting adjacent crank pins. As applied to a shaft, of this type, each counter weight counter-balances one straight or single cheek between a crank pin and a crank bearing and the next adjacent curved or connecting cheek between two crank pins. Four such counter-weights effectively counter-balance the whole shaft and these counter weights are disposed in diametrically opposed positions, so that they also balance each other and the shaft remains in static balance as it would be without the counter-weights.

My invention further relates to the provision of such a shaft in which the counter-weights are forged integral with the remaining parts of the shaft, and also to certain arrangements and combinations of parts which will be hereinafter described and more particularly pointed out in the appended claims.

One form of my invention is shown in the drawings, in which

Fig. 1 is a plan view of a forging for a six-throw three-bearing crank-shaft;

Fig. 2 is a similar view of the finished shaft;

Figs. 3 to 10 inclusive are transverse sectional views taken along the correspondingly numbered lines in Fig. 1 and separately showing the different crank cheeks; and Fig. 11 is a sectional end view of the shaft taken along the line 11—11 in Fig. 1.

Referring to Figs. 1 and 2, I have shown a six-throw three bearing crank-shaft which is in general of a somewhat common type, the bearings being designated as 20, 21 and 22 and the crank pins being indicated by the Roman numerals I to VI. A straight cheek 23 connects the bearing 20 to the crank pin I. Similar straight cheeks 24 and 24$^a$ connect the pins III and IV respectively to the bearing 21. A fourth straight cheek 25 connects the crank pin VI to the bearing 22. A curved cheek 26 connects pins I and II; a curved cheek 27 connects cranks II and III; a similar cheek 28 connects crank pins IV and V; and a fourth curved cheek 29 connects crank pins V and VI.

Disregarding the counter-weights, it will be evident that the straight cheek 23 (Fig. 3) is out of balance and that rotation thereof will produce an unbalanced centrifugal force acting in the direction indicated by the arrow $a$. Similarly, the adjacent curved cheek 26 (Fig. 4) is also out of balance and rotation thereof will produce an unbalanced centrifugal force $b$.

Referring again to Fig. 3, it will be evident that a force $a'$ is necessary to counteract the unbalanced force $a$, and another force $b'$ is necessary to counter-act the unbalanced force $b$. Instead of applying counter-weights to the separate cheeks 23 and 26, acting in the directions $a'$ and $b'$, I have found that entirely satisfactory results may be obtained by applying a single counter-weight 30 in such a position that it will act along the line indicated by the arrow $c$, in the direction of the resultant of the forces $a'$ and $b'$. Such a counter-weight effectively offsets the unbalanced weight of both the straight cheek 23 and the curved cheek 26 and these parts are so closely adjacent that the application of the entire counter-balancing force in the single counter-weight 30 is found to be entirely satisfactory throughout the range of speeds at which such crankshafts are operated.

The curved cheek 27 and the adjacent straight cheek 24 are similarly provided with a single counter-weight 31 acting along the line of the arrow $d$ (Fig. 6). The adjacent cheeks 24$^a$ and 28 are counter-balanced by a weight 32 acting in the line of the arrow $e$ (Fig. 7) and the adjacent cheeks 29 and 25 are counter-balanced by a weight 33 acting in the direction of the arrow $f$ (Fig. 10).

It will be noted that the directions of the arrows $c$ and $d$ are parallel but reversed and the same is true of the arrows $e$ and $f$. The counter-weight 30 thus balances the counter-weight 31 and the counter-weight 32 balances the counter-weight 33 so that the shaft remains in static balance as it would be without the counter-weights.

Remarkably improved results have been obtained by the use of this improved counter-balance construction. For example, a shaft similar to Fig. 1 but without counter-weights, when rotated in yieldingly mounted bearings, showed excessive vibration at 1600 R. P. M., while the same shaft, when counter-weighted as indicated in the drawings, was run at 2400 R. P. M. in the same yielding bearings, almost without perceptible vibration. Such a shaft mounted in the usual rigid engine frame bearings could be driven at perhaps double the latter speed without injurious vibration. A crank shaft thus counter-balanced is accordingly efficient and satisfactory at all speeds incurred in the operation of the shafts.

While I have described my invention as particularly applied to a six-throw shaft having curved connecting cheeks between adjacent crank pins, it will be evident that many of the advantages of my invention may be obtained in crank-shafts other than the particular one described. It will be also obvious that the mass of each counter-weight must be proportioned for the particular design of shaft to be balanced and that this mass may be proportioned to take account also of the crank pins and if desired, of a portion of each engine connecting rod associated therewith.

In the preferred embodiment of my improved shaft, the counter-weights 30, 31, 32 and 33 are forged integral with the remaining parts of the shafts, a suitable method for attaining this result being disclosed in the prior patent to Larcher No. 1,434,215, issued October 31, 1922.

I do not wish to be limited, however, in all cases to the formation of the counter-weights integral with the shaft and it will be evident that other changes and modifications may be made in my invention within the spirit and scope thereof by those skilled in the art.

Therefore I do not wish to be limited to the details herein disclosed otherwise than as set forth in the claims but what I claim is:—

1. A three-bearing multiple crank-shaft of unitary forged construction and having adjacent single and connecting crank cheeks disposed in pairs at oblique angles to each other, with the two unbalanced centrifugal forces produced by each such pair of adjacent cheeks acting in different directions, and a single counter-weight for each such pair of adjacent cheeks, angularly positioned to counter-act the resultant of these two unbalanced forces, said counter-weights being formed integral with said single cheeks and being positioned closely adjacent a crankshaft bearing.

2. A six-throw three-bearing crank-shaft of unitary forged construction and having, in combination, four single cheeks and four connecting cheeks disposed in adjacent pairs, and a single counter-weight for each pair of adjacent cheeks, angularly positioned to counter-act the resultant of the two unbalanced centrifugal forces produced by a single cheek and an adjacent connecting cheek respectively, said counterweight being integral with the single cheek and being positioned closely adjacent a crankshaft bearing.

3. A three-bearing multiple crank-shaft of unitary forged construction and having adjacent single and connecting crank cheeks disposed in pairs at oblique angles to each other, with the unbalanced centrifugal forces produced by and on each such pair of adjacent cheeks acting in different directions, and a single counter-weight for each such pair of adjacent cheeks, angularly positioned to counter-act the resultant of these two unbalanced forces, said counter-weights being formed integral with said single cheeks and being positioned closely adjacent a crankshaft bearing.

In testimony whereof I have hereunto affixed my signature.

JOHN A. OLDSON.